United States Patent [19]

Foret, Sr.

[11] 4,244,090

[45] Jan. 13, 1981

[54] DEVICE FOR ATTACHING AND REMOVING RUBBER BEARING ABOUT PIPE STEMS

[76] Inventor: Albert A. Foret, Sr., Rte. One, Box 393, Pierre Part, La. 70339

[21] Appl. No.: 76,075

[22] Filed: Sep. 17, 1979

[51] Int. Cl.[3] .............................................. B23P 19/02

[52] U.S. Cl. .......................................... 29/235; 29/267

[58] Field of Search .................................. 29/235, 267

[56] References Cited

U.S. PATENT DOCUMENTS

| | | | |
|---|---|---|---|
| 1,704,600 | 3/1929 | Green | 29/267 |
| 4,100,717 | 7/1978 | Kontinen | 29/235 |

FOREIGN PATENT DOCUMENTS

| | | | |
|---|---|---|---|
| 1097147 | 2/1955 | France | 29/267 |

*Primary Examiner*—James L. Jones, Jr.
*Attorney, Agent, or Firm*—Roy, Kiesel, Patterson & McKay

[57] ABSTRACT

A device for attaching and removing rubber bearings about pipe stems is disclosed having bearing grasping assemblies pivotly attached at opposite ends of a cross brace plate having an opening through which a rear grip assembly can slide, and having lever arms pivotly attached at their middle section to one end of the bearing grasping assembly and pivotly attached at one of their ends to one end of the rear grip assembly.

3 Claims, 3 Drawing Figures

DEVICE FOR ATTACHING AND REMOVING RUBBER BEARING ABOUT PIPE STEMS

BACKGROUND OF THE INVENTION

1. Field of the Invention.

This invention relates generally to rubber bearings utilized on drill pipe stems and, more particularly, to devices for attaching and removing the rubber bearings about the pipe stems.

2. Prior Art.

It is the practice in the oil industry to attach rubber bearings about drill pipe stems to help guide the drill pipe down the drilling hole and act as a bearing between the drill pipe casing and the drill pipe to prevent damage to the pipe casing. These rubber bearings are tubular members constructed of hard rubber that is slit so that its side walls can be spread apart to fit around the pipe stem. The present practice is for a person to grip the sidewalls with his fingers and pull them apart. For the larger rubber bearings designed to fit about 3" or larger pipe stems, this becomes quite difficult and has resulted in severe injury to the person's fingers as they are pinched between the pipe and bearing.

SUMMARY OF THE INVENTION

Therefore, one object of this invention is to provide a device that can easily and quickly, but safely, attach or remove a rubber bearing about a pipe stem.

This and other objects and advantages to this invention will become apparent from the ensuing descriptions of the invention.

Accordingly, a device to attach or remove rubber bearings to pipe stems is provided comprising bearing grasping assemblies, each having a support arm with a grasping finger means attached at one end, a cross plate brace pivotly attached to the middle section of each support arm, a rear grip assembly having a shaft that slides back and forth through an opening in the cross plate and having a gripping pad attached to one end of the shaft facing the grasping finger means, and lever arms each pivotly attached at one end to the shaft and each pivotly attached at its middle section to different support arms at an end opposite the grasping finger means.

PREFERRED EMBODIMENTS OF THE INVENTION

Figure 1:
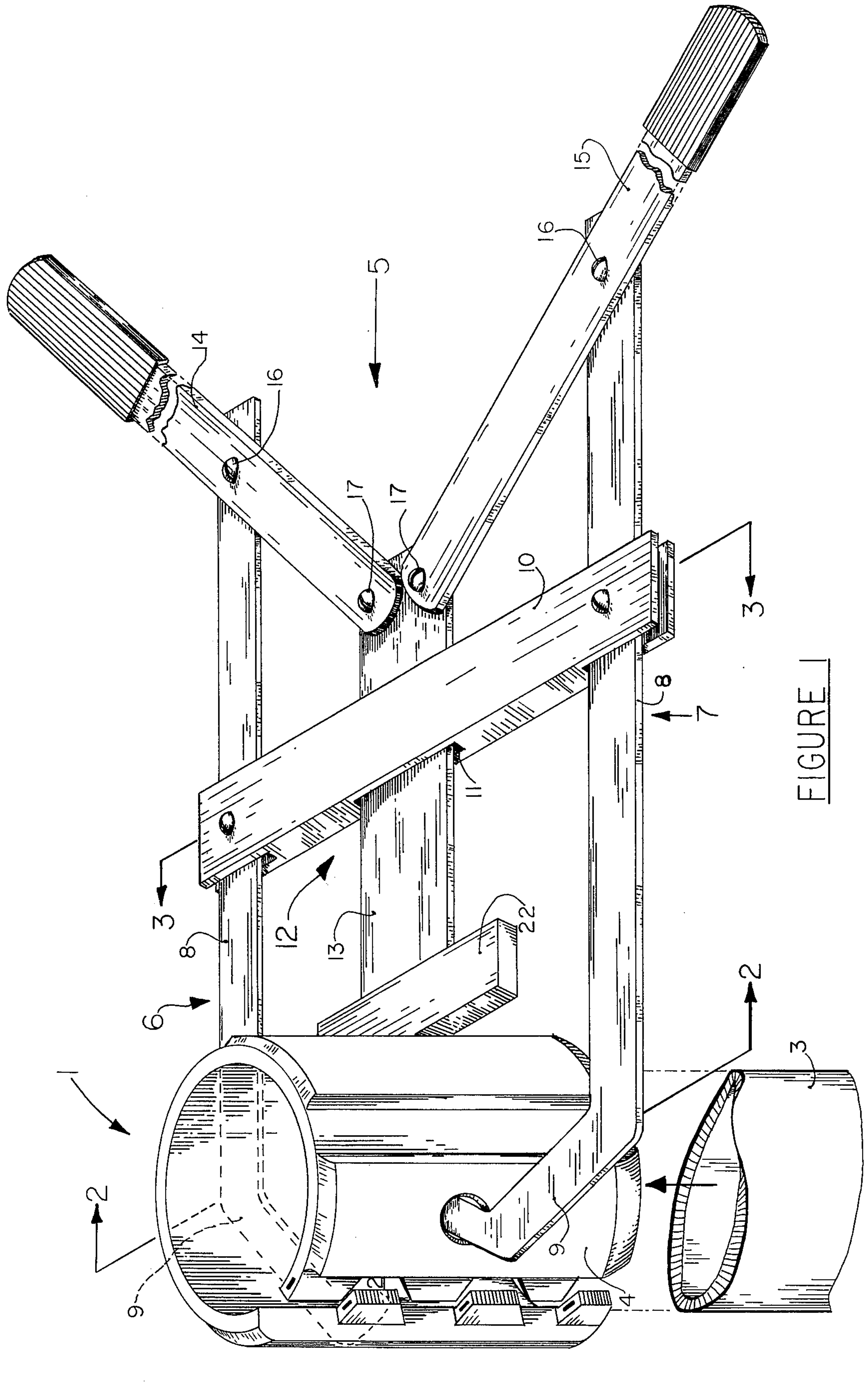
FIG. 1 is a three dimensional view of one embodiment of this invention gripping a conventional rubber bearing.
Figure 3:
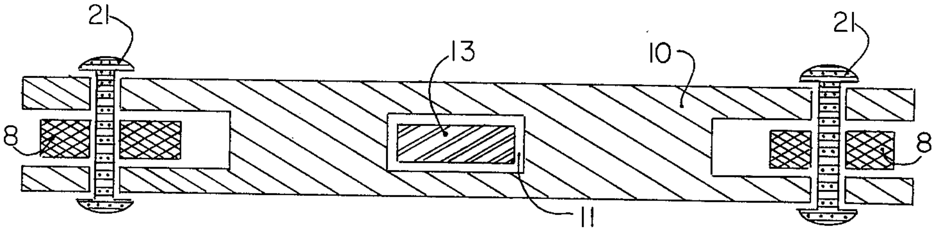
FIG. 3 is a cross sectional view taken along lines 3—3 of FIG. 1.

Shown in FIG. 1 is a rubber bearing, denoted generally by the numeral 1, having an interlocking groove slit 2 which is to be fitted about pipe stem 3. In order to pry open the bearing sidewalls 4 to widen slit 2 sufficiently to fit about pipe stem 3, a device, denoted generally by the numeral 5, is utilized. Device 5 comprises, in general, bearing grasping assemblies 6 and 7, each having support arms 8 and grasping finger means 9, a cross plate brace 10 having an opening 11 through which shaft 13 of rear grip assembly 12 can slide back and forth, and lever arms 14 and 15 pivotly attached by pins 16 and 17, respectively, to support arms 8 and shaft 13.

Figure 2:
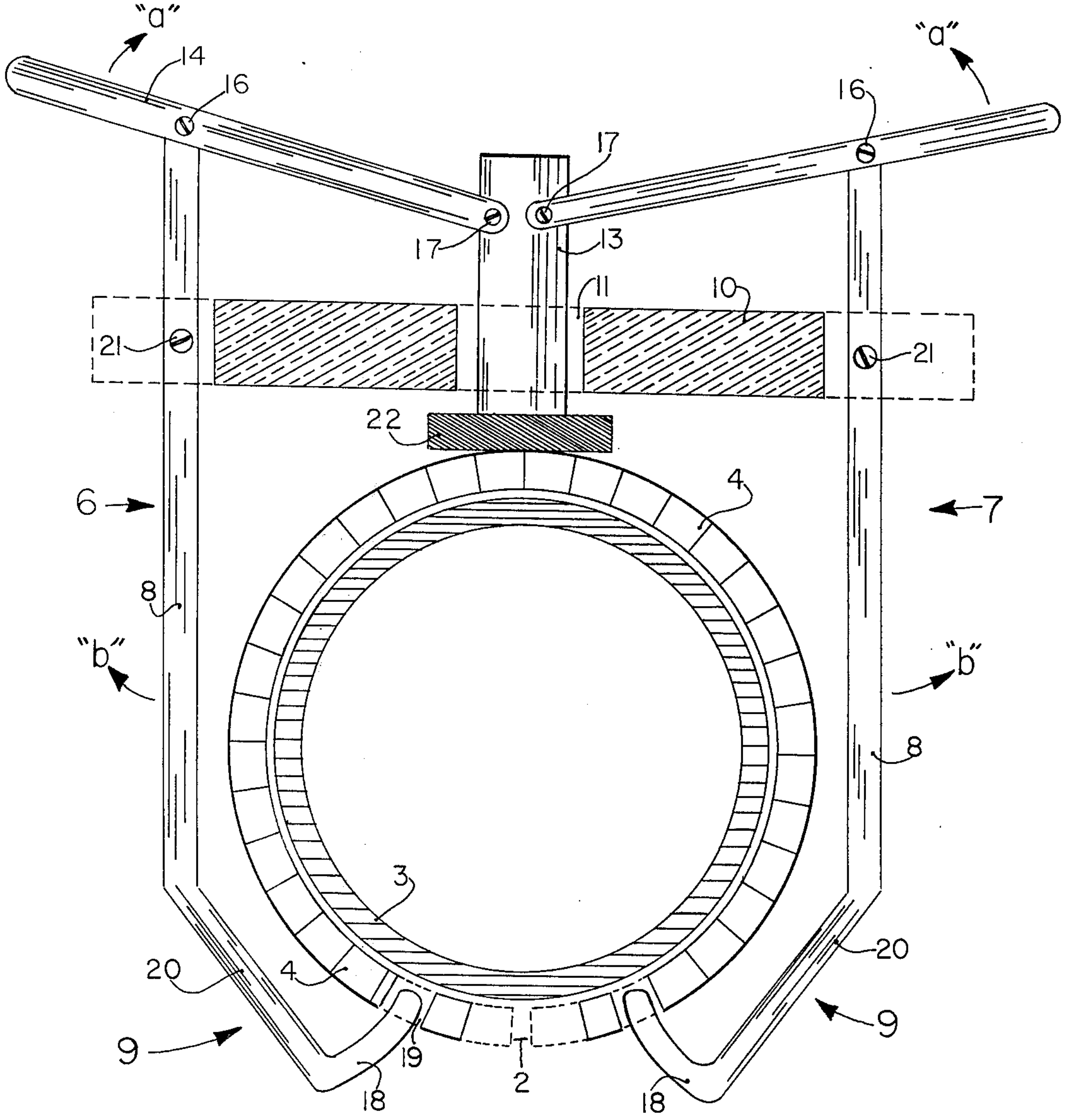
FIG. 2 is a cross sectional view taken along lines 2—2 of FIG. 1.

In a preferred embodiment, gripping finger means 9 is provided with an arcuate shaped end 18 which fits into slit 2 or, more preferably, into cavities 19 drilled into bearing sidewalls 4 as seen more clearly in FIG. 2. Support arms 8 extend on either side of rubber bearing 1 and are rigidly attached at an angle to the straight shank 20 of grasping finger means 9. Arms 8 extend back past bearing 1 to allow cross plate brace 10 to be pivotly attached at each end by pins 21 to the middle section of arms 8.

In another preferred embodiment, lever arms 14 and 15 are attached to both arms 8 and shaft 13 so that when lever arms 14 and 15 are moved in the direction of the arrows "a" shown in FIG. 2, two things occur: (1) shaft 13 is forced in the direction of bearing sidewalls 4 and (2) grasping assemblies 6 and 7 are forced to pivot about pins 21 in the direction shown by arrows "b".

It is preferred that a gripping pad 22, more preferably being a flat rigid plate, be perpendicularly attached to shaft 13 to face grasping finger means 9 and push against bearing sidewall 4 when lever arms 14 and 15 are pushed toward one another.

In operation, arcuate shaped ends 18 are placed in cavities 19. Lever arms 14 and 15 are pushed together resulting in widening slit 2 until it is wide enough to slip about pipe stem 3. Lever arms 14 and 15 are pushed away from each other allowing rubber bearing sidewalls 4 to come together and seal in a continuous ring about pipe stem 3.

There are, of course, many alternate embodiments not specifically disclosed but which are intended to be included within the scope of this invention as defined by the following Claims.

I claim:

1. A device to attach or remove rubber bearings having a slit down one side about pipe stems which comprises:

(a) bearing grasping assemblies positioned with said rubber bearing between them, said bearing grasping assemblies each having a support arm with a grasping finger means attached at one end and said grasping finger means attachable to said rubber bearing on opposite sides of said slit;

(b) a cross plate brace pivotly attached to the middle section of each support arm, said cross plate brace having an opening through which a rear grip assembly can slide back and forth, said rear grip assembly comprising:

(i) a shaft slidable back and forth through said opening, (ii) a gripping pad attached to one end of said shaft facing said grasping finger means; and (c) lever arms each pivotly attached at one end to said shaft and each pivotly attached at its middle section to one of said support arms at an end opposite said grasping finger means.

2. A device according to claim 1 wherein each of said grasping finger means comprises a metal shank having an arcuate shaped end for gripping said rubber bearing.

3. A device according to claim 1 wherein said gripping pad comprises a rigid place wherein said shaft is perpendicularly attached.

* * * * *